Aug. 20, 1940. R. J. ROTHENBERGER ET AL 2,212,213
MEANS FOR SHELLING NUTS
Filed March 29, 1938 2 Sheets-Sheet 1
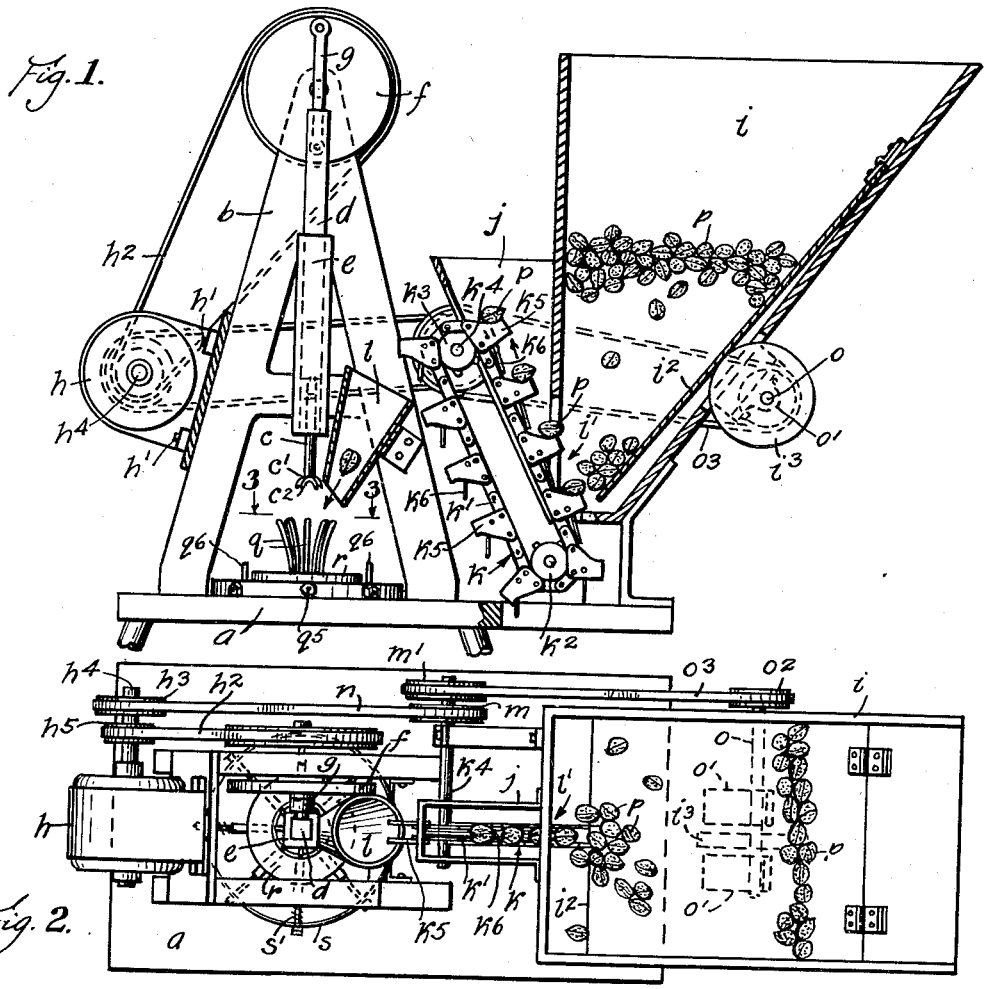
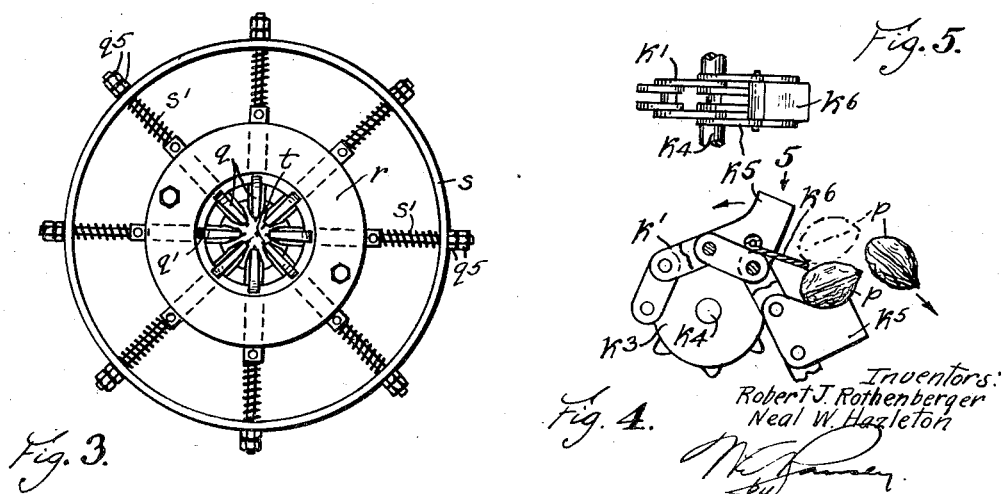
Inventors:
Robert J. Rothenberger
Neal W. Hazleton
Attorney.

Aug. 20, 1940.    R. J. ROTHENBERGER ET AL    2,212,213
MEANS FOR SHELLING NUTS
Filed March 29, 1938    2 Sheets-Sheet 2
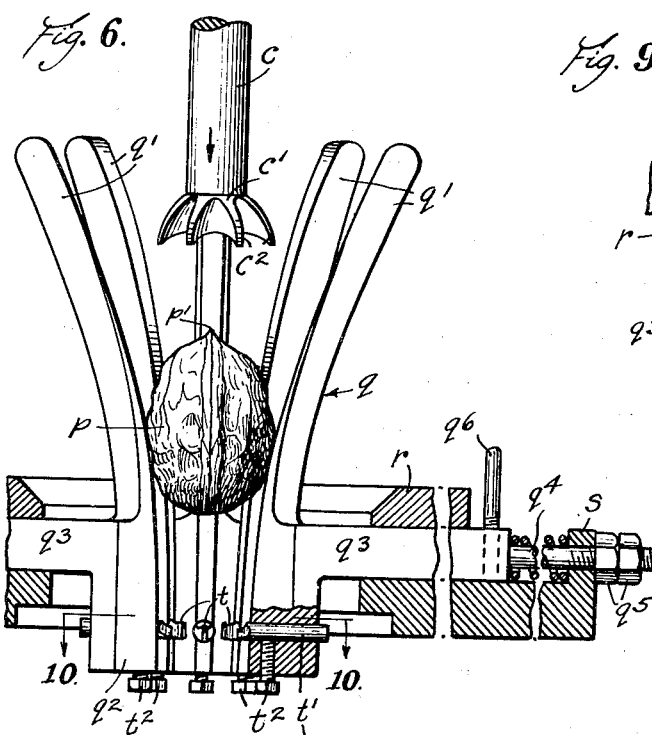
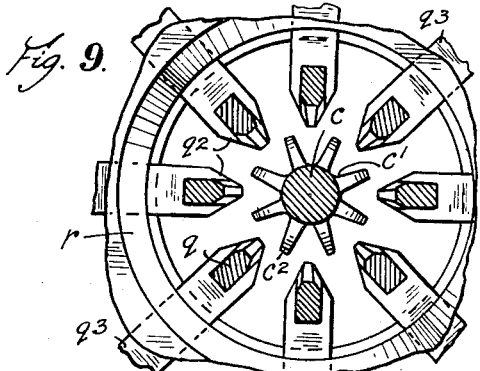
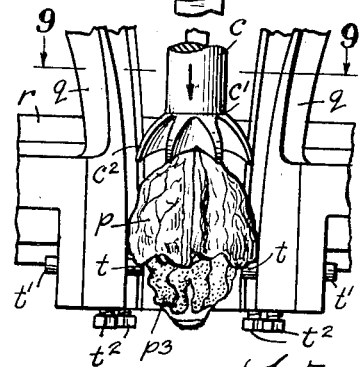
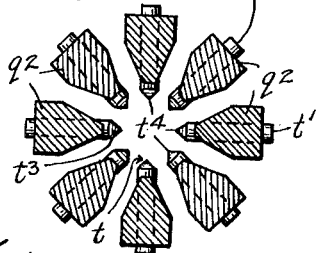
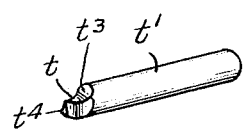
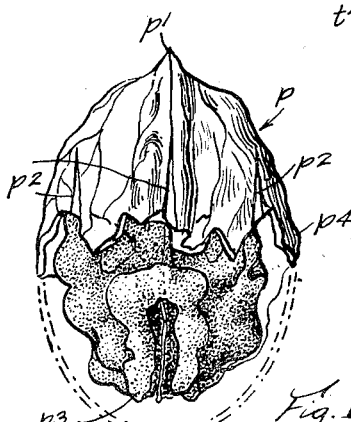
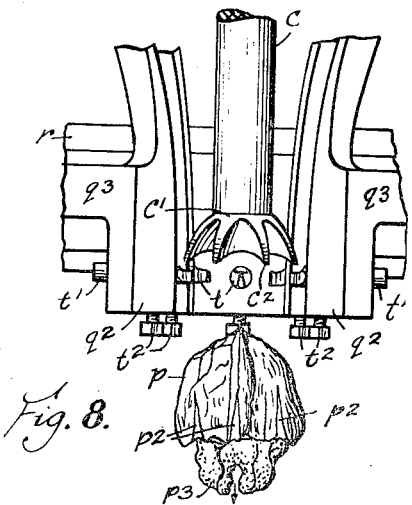
Inventors:
Robert J. Rothenberger
Neal W. Hazleton
by
Attorney.

Patented Aug. 20, 1940

2,212,213

UNITED STATES PATENT OFFICE 2,212,213

MEANS FOR SHELLING NUTS

Robert J. Rothenberger, Sherwood, and Neal W. Hazleton, Newberg, Oreg.; said Hazleton assignor to said Rothenberger Application March 29, 1938, Serial No. 198,668

7 Claims. (Cl. 146—10)

The object of our invention is to provide a machine for quickly and easily cracking the shells of nuts, such for example as walnuts. Said invention functions so that the meat of said nuts can be easily picked out to produce a maximum of whole halves. Nuts vary in size and their shells also vary in thickness and hardness. The meat of a walnut, for example, also is of irregular shape and said meat grows about the transverse web of the walnut shell. If said shells are broken by pressure jaws or by a blow or several blows, the pressure necessary or the effective force of said blows is difficult to control. Thus, it is too severe in some cases and insufficient in others. This is because the general hardness and thickness of the said shell varies and also because a shell is ridged and irregular, and thus the effectiveness of said cracking action depends upon what portion of the shell is subject to blows. The nuts are also not spherical or uniform in size.

We have discovered that when nuts are dried that the meat shrinks within the shell to a substantial degree. In walnuts the meat is suspended upon a transverse web and is spaced substantially uniformly from the interior surface of the encompassing shell. That is, in drying, the meat shrinks away from the shell to leave an air space surrounding said meat and which space is of substantial depth.

We utilize this phenomenon in our invention in aiding in the removal of the shell from the meat by forcing the nut endwise thru an encircling ring of sharp-nosed teeth. The teeth are set to define a ring of slightly smaller diameter than the smallest nut to be accommodated. Said teeth are held in retractable jaws which define the operating mouth of a machine embodying our invention. Said jaws are spring pressed and are held yieldingly by said spring at said minimum setting. Said jaws are longitudinally arranged and are inclined towards the narrower portion defining said operating mouth, and thus when a larger nut is to be accommodated, said jaws are spread open by the shell of the nut before it reaches the sharp-nosed teeth. The teeth extend inwardly from the jaws to a degree corresponding to the thickness of the shell to be operated upon.

A reciprocal plunger forces the nut into said mouth and past said teeth so that said teeth form a series of radially disposed grooves in said shell. Because of said air space, said teeth may be permitted to extend thru a shell because the meat is extended inwardly therefrom and will not be scratched or injured by said protruding teeth. If the teeth do not actually form grooves extending entirely thru the shell to break the shell into separated portions, said teeth will form shallow grooves so that the shell can be easily broken along said grooves. Frequently said teeth, in forming said grooves, break away the entire forward end of the shell so that the meat can be picked bodily from the remainder. The meat does not drop out of the remainder of said shell because it is wedged upon said transverse web in the shell.

These and other features of our invention are hereinafter described and illustrated in the accompanying drawings, in which:

Fig. 1 is a longitudinal section taken thru a machine embodying our invention;

Fig. 2 is a plan view thereof;

Fig. 3 is a larger scaled detailed view taken substantially on the line 3—3 in Fig. 1;

Fig. 4 is a diagrammatic illustration of the manner in which the feeding means is adapted to insure but one nut being dropped into the operating mouth of said machine;

Fig. 5 is a plan view taken in the direction of the arrow 5 in Fig. 4;

Fig. 6 is an enlarged detail view illustrating the manner in which a walnut is accommodated within the operating mouth of the crushing jaws and adapted to be engaged by a plunger to form radially disposed serrating grooves thru the shell of said nut;

Fig. 7 is a similar view, although fragmentary, illustrating the progress of the plunger in forcing said shell onto the grooving teeth;

Fig. 8 is a further fragmentary view showing the plunger at the end of its operating stroke;

Fig. 9 is a fragmentary sectional view taken on the line 9—9 in Fig. 7;

Fig. 10 is a sectional view taken on the line 10—10 in Fig. 6;

Fig. 11 is a diagrammatic illustration of the manner in which our improved method and machine remove portions of the walnut shell to make the meat easily picked therefrom; and Fig. 12 is a perspective view of one of the operating grooving teeth removed from the jaw in which it is secured.

A walnut cracking machine embodying our invention comprises a base $a$, to which is secured a vertically extending A-frame $b$. Reciprocally mounted in said A-frame is a plunger $c$, secured to a crosshead $d$. Said crosshead is reciprocally mounted in a guide $e$, secured to the frame $b$. Arranged upon the apex of said A-frame is a crank disc $f$, and said crank disc is operatively joined to the crosshead by a pitman $g$. Said crank disc is operatively driven by a motor $h$ secured to the A-frame by bolts $h'$ and operatively connected to the crank disc by an endless belt $h2$.

A hopper $i$ is also carried by said base and is preferably made with diverging sides and with a relatively narrow discharge mouth $i'$ at the bottom thereof. Extending outwardly from said hopper is an apron $j$ which is substantially narrower than the hopper, and an endless chain conveyor $k$ is adapted to pick nuts from said apron and discharge them in a funnel-shaped conduit $l$. Said conveyor comprises a linked chain $k'$, mounted over two spaced sprockets $k2$ and $k3$. The lowermost sprocket $k2$ is an idler and the uppermost sprocket $k3$ is keyed to an operating shaft $k4$, having two driving pulleys $m$—$m'$, mounted thereon. The drive pulley $m$ is operatively driven by an endless belt $n$ which engages with a motor pulley $h3$ upon shaft $h4$ of the electric motor $h$. Said motor pulley $h3$ lies outside the motor pulley $h5$ which carries endless belt $h2$.

The rotation of the sprocket $k3$ causes the conveyor chain $k'$ to rotate counterclockwise, as viewed in Fig. 1. Said conveyor carries a series of laterally projecting cups $k5$ which are proportioned each to hold one nut to be cracked. A kicker $k6$ so-called is carried above each of said cups and functions to throw off all but one nut in a cup. This is illustrated in Fig. 4. That is, as the conveyor $k$ moves over the sprocket $k3$, the link secured to each cup tends to lift the kicker so that it passes closely over the top of a nut carried by the cup arranged immediately below it. This throws said nut from said cup and thus insures but one nut being dropped at a time into said funnel-shaped conduit $l$.

Inasmuch as the nuts are arranged in relatively large quantities in the hopper $i$, it frequently occurs that said nuts mass therein and do not flow freely thru the discharge mouth $i'$. To prevent said massing, we provide an agitator or breather $i2$ arranged upon the converging wall of said hopper opposed to said aperture $i'$. Said agitator preferably is a section of flexible material and an eccentric cam $i3$ is adapted to engage its under-surface, as is illustrated in Fig. 1, and to cause it to move slowly upwardly and downwardly to dislodge any quantity of nuts which might mass or wedge in said hopper. Said cam $i3$ is carried by a shaft $o$, carried by journal bearings $o'$ and having a pulley $o2$ fixed to its outer end. Said pulley is alined with drive pulley $m'$ and operatively connected thereto by an endless belt $o3$.

The nuts $p$ to be cracked are discharged from the conduit $l$ into a mouth defined within a plurality of converging fingers constituting jaw members $q$. Said fingers are slidably mounted in an annular plate $r$, bolted to the base $a$. Each finger resembles, somewhat, a bricklayer's hammer. The end or hammering portion, to carry out said analogy, is arranged downwardly, while the adz portion is arranged upwardly, and the handle portion is arranged laterally or horizontally. A plurality of these fingers are arranged to define a circular aperture, as is shown in Fig. 9. The upper ends $q'$ are diverging with respect to the lower ends $q2$. Thus, when a nut falls from the conduit $l$, it drops between the upper ends of said fingers. In the drawings, eight are shown. The nut in falling down said fingers is adapted to be arranged endwise, as is shown in Fig. 6, by the structure of said fingers. The lateral or handle portions $q3$ of said fingers are square in section, and are slidably mounted to the body of said annular plate member $r$. Surrounding said plate member is a ring $s$. Encircling springs $s'$ are arranged about the shank portions $q4$ of said fingers. The outermost ends of said shank portions $q4$ are threaded and carry nuts $q5$.

Said nuts engage the outer face of the ring $s$ and limit the inward movement of the fingers under the influence of the coiled spring $s'$. Said nuts are adjustable upon the threaded shanks $q4$, and preferably two nuts are provided, one to lock the other. The setting of said nuts $q5$ determines the diameter of the mouth. The mouth size is adjusted to correspond to the smallest nut to be accommodated. An upstanding projecting pin $q6$ is preferably provided on each finger so that each individual finger may be retracted manually against its spring for adjustment or examination.

Laying at the lower end $q2$ of each finger is an inwardly projecting sharp-nosed tooth $t$. Said tooth is preferably formed upon the end of of a cylindrical member $t'$, as is illustrated in Fig. 12. Said tooth extends thru a lateral bore in said lower end $q2$, and is fixed in position by a set screw $t2$. The degree to which it extends inwardly of the fingers $q$ is determined by the thickness of the shell of the nut being operated upon. The tooth should extend inwardly sufficient to cut thru the shell or to form a relatively deep groove therein. The inner end of said tooth, that is, the point thereof, is formed upon a curved upwardly disposed face $t3$, and the point $t4$ thereof is preferably of substantial depth and forms a triangular face to give sufficient body behind the relatively sharp tooth to resist distortion.

The plunger $c$ is provided with a head $c'$ which is serrated, and between the serrations are formed outstanding tines or prongs $c2$. The under-surface of said head is cupped so as to hold the end $p'$ of a nut and tends prevent it from falling laterally under the pressure of said plunger in moving a nut lengthwise of the jaws formed by the fingers $q$. As is shown in Fig. 9, said prongs are adapted to straddle the fingers $q$ forming the jaws of said machine. This tends to prevent any interference between said plunger and said jaws, and the teeth which the latter carry.

Our machine operates as follows: A relatively large quantity of nuts is arranged in the hopper $i$, and preferably the upper level of said quantity lies somewhere near the top portion of the hopper. The reason that it is desirable to operate with a large quantity is that they tend to mass the underlying nuts downwardly and thru the aperture at the bottom thereof. The conveyor $k$ with its laterally extending cup picks the nuts thru said aperture and tends to rake a quantity of them outwardly in the apron $j$, which extends upwardly beyond the top of the path traversed by said conveyor cups. When a large quantity of nuts is arranged in said hopper, a related quantity of nuts stands in said apron. This tends to prevent the nuts carried by the cups from falling off, and if one does fall off, another one will be picked up by the cup, and thus each cup will carry an individual nut. As has hereinbefore been described, if more than one nut is lodged upon a cup, it is kicked off by the kicker $k6$ which extends above it, as is diagrammatically illustrated in Fig. 4. The nuts are thus deposited one at a time in the funnel-shaped conduit $l$.

It is to be noted that the plunger $c$, the conveyor $k$, and incidentally, the agitator in the hopper, are driven by a common motor. Said plunger and the conveyor, thus, are synchronized and timed so that a nut will be discharged into the funnel-shaped conduit when the plunger is on its upstroke. Thus, upon each downstroke of the plunger, a nut will be forced into the mouth and past the encircling ring of raking teeth to groove and break said shell so that the meat can be removed easily therefrom. The nut will fall into the jaw, formed by the fingers $q$, to the position shown in Fig. 6. The nut normally is arranged endwise, as is shown in said figure, and thus when the plunger comes down upon it, it will engage one end thereof. The continued movement of the plunger will force it downwardly thru said jaws and will tend to force said jaws outwardly against their springs $s'$. Inasmuch as the gouging teeth $t$ are carried by the fingers or jaw members, they will be moved outwardly with said jaws. The jaws are forced outwardly substantially uniformly and thus the diameter of the mouth formed by said jaws is enlarged by the nut itself to accommodate the jaw members to the particular nut operated upon. The degree to which each tooth extends inwardly from the jaws being fixed, thus causes said teeth to extend inwardly from the jaws a uniform distance in each case. The plunger thus forces said jaws downwardly against said inwardly projecting teeth. The teeth are provided with sharp points which gouge into the shell, and when they reach a point where the sharpened end of the tooth extends thru the shell, the nut is subject to substantial pressure. This frequently causes the nut to become cracked, and the grooves formed by said tooth tend to separate the portions of the shell, and it is common for a nut to be discharged from the machine with the shell partially broken away, as illustrated by the nut shown in Fig. 11. That is, the lowermost or the forward end of the nut has been substantially broken away, while the upper portion is intact but carrying grooves $p2$ therein. The meat of a walnut is carried by a transverse web $p3$ which is secured to the unbroken portion of the shell $p4$ of said nut. Thus, the nut is not removed from the shell but is secured thereto by said web. Thus, the meat is not broken or crushed by the violent blow to which the shell is subjected. The nut thus partially broken enables the meat to be easily removed therefrom. It is common practice to pay a premium for nuts, and particularly walnuts, having full halves. By the invention embodied in our machine, a large proportion of the nuts are cracked so that whole halves can be secured therefrom, and said machine provides efficient means for cracking nuts in volume.

We claim:

1. A nut cracking device comprising a plunger and a series of radially extending fingers arranged about and defining a nut holding mouth between them normally of slightly less diameter than that of the nut to be cracked, said fingers comprising T-shaped members, one branch of each of said members extending substantially vertically and another extending horizontally, an annular base member having an aperture formed therein, the inside diameter of which is substantially greater than that of said mouth, said aperture being aligned with said mouth, the horizontal branches of said fingers slidably engaging said base member, yieldable means for holding said fingers closely about said mouth, and cutting points mounted upon the lower ends of each of the vertical branches of said fingers, each of said cutting points being adapted independently to yield radially of said mouth and with the finger upon which it is carried under the pressure exerted upon the finger carrying said point thereby to adjust said mouth to accommodate a nut of irregular outline, said plunger having a cup-shaped head of serrated outline adapted to reciprocate longitudinally of the way leading to the mouth and through said mouth, the serrations straddling the fingers and cutting points whereby a nut is forced longitudinally along the edges of the fingers and past said cutting points subjecting said nut simultaneously to pressure and peripheral grooving to divide the nut shell into separated sections.

2. A nut cracking device comprising a plunger and a series of radially extending fingers arranged about and defining a nut holding mouth between them normally of slightly less diameter than that of the nut to be cracked, said fingers comprising T-shaped members, one branch of each of said members extending substantially vertically and another extending horizontally, the upper portions of the vertical branches of said members being of relatively thin sections, being inclined away from said mouth to form a funnel-shaped receiver above and directed toward said mouth and being several times longer than the diameter of the nut to be cracked and proportioned to guide a nut into said mouth and to aline it therewith, an annular base member having an aperture formed therein the inside diameter of which is substantially greater than that of said mouth, said aperture being aligned with said mouth, the horizontal branches of said fingers slidably engaging said base member, yieldable means for holding said fingers closely about said mouth, and cutting points mounted upon the lower ends of each of the vertical branches of said fingers, each of said cutting points being adapted independently to yield radially of said mouth and with the finger upon which it is carried under the pressure exerted upon the finger carrying said point thereby to adjust said mouth to accommodate a nut of irregular outline, said plunger having a cup-shaped head of serrated outline adapted to reciprocate longitudinally of the way leading to the mouth and through said mouth, the serrations straddling the fingers and cutting points whereby a nut is forced longitudinally along the edges of the fingers and past said cutting points subjecting said nut simultaneously to pressure and peripheral grooving to divide the nut shell into separated sections.

3. A nut cracking device comprising a plunger and a series of radially extending fingers arranged about and defining a nut holding mouth between them normally of slightly less diameter than that of the nut to be cracked, said fingers comprising T-shaped members, one branch of each of said members extending substantially vertically and another extending horizontally, an annular base member having an aperture formed therein the inside diameter of which is substantially greater than that of said mouth, said aperture being aligned with said mouth, the horizontal branches of said fingers slidably engaging said base member, yieldable means for holding said fingers closely about said mouth, said horizontal branches being non-circular in section, and cutting points mounted upon the lower ends of each of the vertical branches of said fingers each of said cutting points being adapted independently to yield radially of said mouth and with the finger upon which it is carried under the pressure exerted upon the finger carrying said point thereby to adjust said mouth to accommodate a nut of irregular outline, said plunger having a cup-shaped head of serrated outline adapted to reciprocate longitudinally of the way leading to the mouth and through said mouth, the serrations straddling the fingers and cutting points whereby a nut is forced longitudinally along the edges of the fingers and past said cutting points subjecting said nut simultaneously to pressure and peripheral grooving to divide the nut shell into separated sections.

4. A nut cracking device comprising a plunger and a series of radially extending fingers arranged about and defining a nut holding mouth between them normally of slightly less diameter than that of the nut to be cracked, said fingers comprising T-shaped members, one branch of each of said members extending substantially vertically and another extending horizontally, an annular base member having an aperture formed therein the inside diameter of which is substantially greater than that of said mouth, said aperture being aligned with said mouth, the horizontal branches of said fingers slidably engaging said base member, yieldable means for holding said fingers closely about said mouth, and cutting points adjustably mounted upon the lower ends of each of the vertical branches of said fingers, each of said cutting points being adapted independently to yield radially of said mouth and with the finger upon which it is carried under the pressure exerted upon the finger carrying said point thereby to adjust said mouth to accommodate a nut of irregular outline, said plunger having a cup-shaped head of serrated outline adapted to reciprocate longitudinally of the way leading to the mouth and through said mouth, the serrations straddling the fingers and cutting points whereby a nut is forced longitudinally along the edges of the fingers and past said cutting points subjecting said nut simultaneously to pressure and peripheral grooving to divide the nut shell into separated sections.

5. A nut cracking device comprising a plunger and a series of radially extending fingers arranged about and defining a nut holding mouth between them normally of slightly less diameter than that of the nut to be cracked, said fingers comprising T-shaped members, one branch of each of said members extending substantially vertically and another extending horizontally, an annular base member having an aperture formed therein the inside diameter of which is substantially greater than that of said mouth, said aperture being aligned with said mouth, the horizontal branches of said fingers slidably engaging said base member, yieldable means for holding said fingers closely about said mouth, and cutting points mounted upon the lower ends of each of the vertical branches of said fingers, said lower ends being thin and being arranged edgewise toward said mouth, each of said cutting points being adapted independently to yield radially of said mouth and with the finger upon which it is carried under the pressure exerted upon the finger carrying said point thereby to adjust said mouth to accommodate a nut of irregular outline, said plunger having a cup-shaped head of serrated outline adapted to reciprocate longitudinally of the way leading to the mouth and through said mouth, the serrations straddling the fingers and cutting points whereby a nut is forced longitudinally along the edges of the fingers and past said cutting points subjecting said nut simultaneously to pressure and peripheral grooving to divide the nut shell into separated sections.

6. A nut cracking device comprising a plunger and a series of radially extending fingers arranged about and defining a nut holding mouth between them normally of slightly less diameter than that of the nut to be cracked, said fingers comprising T-shaped members, one branch of each of said members extending substantially vertically and another extending horizontally, an annular base member having an aperture formed therein the inside diameter of which is substantially greater than that of said mouth, said aperture being aligned with said mouth, the horizontal branches of said fingers slidably engaging said base member, yieldable means for holding said fingers closely about said mouth, cutting points mounted upon the lower ends of each of the vertical branches of said fingers, and adjustable means for fixing said normal diameter of said mouth, each of said cutting points being adapted independently to yield radially of said mouth and with the finger upon which it is carried under the pressure exerted upon the finger carrying said point thereby to adjust said mouth to accommodate a nut of irregular outline, said plunger having a cup-shaped head of serrated outline adapted to reciprocate longitudinally of the way leading to the mouth and through said mouth, the serrations straddling the fingers and cutting points whereby a nut is forced longitudinally along the edges of the fingers and past said cutting points subjecting said nut simultaneously to pressure and peripheral grooving to divide the nut shell into separated sections.

7. A nut cracking device comprising a plunger and a series of radially extending fingers arranged about and defining a nut holding mouth between them normally of slightly less diameter than that of the nut to be cracked, said fingers comprising T-shaped members, one branch of each of said members extending substantially vertically and another extending horizontally, the upper portions of the vertical branches of said members being of relatively thin sections, being inclined away from said mouth to form a funnel-shaped receiver above and directed toward said mouth and being several times longer than the diameter of the nut to be cracked and proportioned to guide a nut into said mouth and to aline it therewith, an annular base member having an aperture formed therein the inside diameter of which is substantially greater than that of said mouth, said aperture being aligned with said mouth, the horizontal branches of said fingers slidably engaging said base member, yieldable means for holding said fingers closely about said mouth, said horizontal branches being non-circular in section, cutting points mounted upon the lower ends of each of the vertical branches of said fingers, said lower ends being thin and being arranged edgewise toward said mouth, and adjustable means for fixing said normal diameter of said mouth, each of said cutting points being adapted independently to yield radially of said mouth and with the finger upon which it is carried under the pressure exerted upon the finger carrying said point thereby to adjust said mouth to accommodate a nut of irregular outline, said plunger having a cup-shaped head of serrated outline adapted to reciprocate longitudinally of the way leading to the mouth and through said mouth, the serrations straddling the fingers and cutting points whereby a nut is forced longitudinally along the edges of the fingers and past said cutting points subjecting said nut simultaneously to pressure and peripheral grooving to divide the nut shell into separated sections.

ROBERT J. ROTHENBERGER.
NEAL W. HAZLETON.